(12) United States Patent
Maruyama

(10) Patent No.: US 6,377,188 B1
(45) Date of Patent: Apr. 23, 2002

(54) SIGNAL SUPPLYING AND RECEIVING SYSTEM

(75) Inventor: Atsushi Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/534,106

(22) Filed: Sep. 26, 1995

(30) Foreign Application Priority Data

Sep. 30, 1994 (JP) .............................................. 6-236872

(51) Int. Cl.⁷ ................................................. H04Q 1/00
(52) U.S. Cl. ............................ 340/825.69; 340/825.24; 340/971; 381/81
(58) Field of Search ................ 381/81, 86; 340/825.25, 340/825.24, 971; 455/5

(56) References Cited

U.S. PATENT DOCUMENTS

| | | | | |
|---|---|---|---|---|
| 3,566,038 A | * | 2/1971 | Slavin | 340/825.25 |
| 4,228,402 A | * | 10/1980 | Plummer | 340/825.25 |
| 4,428,078 A | * | 1/1984 | Kuo | 340/825.25 |
| 4,774,514 A | * | 9/1988 | Hildebrandt | 340/971 |
| 4,835,604 A | * | 5/1989 | Kondo | 455/5 |
| 4,866,515 A | * | 9/1989 | Tagawa | 340/825.25 |
| 5,311,325 A | * | 5/1994 | Edwards | 340/825.34 |
| 5,596,647 A | * | 1/1997 | Wakai | 395/2.09 |

FOREIGN PATENT DOCUMENTS

| | | |
|---|---|---|
| EP | 282183 | 9/1988 |
| EP | 416455 | 3/1991 |
| JP | 1260951 | 10/1989 |
| JP | 131430 | 12/1989 |
| JP | 1301431 | 12/1989 |

* cited by examiner

*Primary Examiner*—Brian Zimmerman
(74) *Attorney, Agent, or Firm*—Ronald P. Kananen; Rader, Fishman & Grauer, PLLC

(57) ABSTRACT

An audio signal supplying device for supplying signals to an operating panel for a passenger provided in each of for many seats of a moving vehicle, such as an aircraft or a train, in which the necessity of providing a dedicated adapter or headphone or a device of a complex structure may be eliminated to save costs. The audio signal supplying device has plural operating units for passengers. For example, an operating unit $3_1$ for the passenger has a demultiplexor 12 as a channel selection means for selecting a desired channel and a controller $6_1$ for inhibiting part of channel selection executed by the demultiplexor 12 and for canceling such partial inhibition of channel selection by the demultiplexor 12 in response to a remote control signal received by a remote controlled light receiving unit $9_1$.

10 Claims, 3 Drawing Sheets

SIGNAL SUPPLYING AND RECEIVING SYSTEM

BACKGROUND OF THE INVENTION

This invention relates to a signal supplying device for supplying signals to an operating panel for a passenger provided in each of plural seats of a moving vehicle, such as an aircraft or a train.

In a moving vehicle, such as an aircraft or train, it is possible for the passenger in each seat to select a desired channel from several choices to hear e.g., audio signals over a headphone or an earphone.

Among the several channels, there are channels dedicated to programs for which a fee is charged. These programs are offered by a system in which an opening in a headphone jack or an air tube fitted on the seat is configured so as not to be engaged by a plug and the crew in charge hands over an adapter to a passenger who has paid the fee permitting the headphone to be inserted into the opening only by the passenger who has paid the fee.

If the program is offered in a manner described above, the adapter is likely to be lost. On the other hand, the operating cost is raised because a headphone different from that for an ordinary program has to be provided for the program for which a fee is charged.

It may also be contemplated to provide a card reader e.g., a credit card reader for each seat to permit the program to be paid for by credit card. Although this system saves the labor of the crew to collect the fee and there is no risk of loss of the adapter, the device and the system become complex thus raising the cost.

SUMMARY OF THE INVENTION

It is therefore an object of the present invention to provide a signal supplying and receiving system in which the dedicated adapter or the headphone as well as a complex device may be eliminated to realize low cost.

According to the present invention, there is provided a signal supplying/receiving system having an operating unit for a passenger provided in each of plural seats for passengers within a moving [vehicle], and a supplying device for supplying signals to said operating unit. The signal supplying/receiving system includes selecting means for selecting an optional one of plural channels supplied from the supplying device, and control means for controlling the selection means for inhibiting selection of one or more channels among the plural channels. The control means also causes inhibition of selection of the one or more channels to be canceled responsive to a remote control signal received by a remote control signal receiving unit.

Preferably, the remote control signal includes a code specifying the cancellation of inhibition of selection of the one or more channels and an ID signal for identifying the seat.

Preferably, the control means causes the inhibition of selection of the one or more channels by the selection means of an operating unit for the passenger when a seat specified by the ID signal included in the remote control actuating signal is coincident with the operating unit for the passenger associated with the control unit.

Preferably, the remote control signal is an infra-red light beam emitted by a remote controller.

Preferably, the remote control signal receiving unit is provided for each of groups of seats made up of a plurality of the seats.

Preferably, an actuating panel is further provided in the signal supplying/receiving system. The selection means selects a channel selected by a passenger via the actuating panel.

Preferably, the signals supplied from the supplying device are audio signals.

DESCRIPTION OF THE PREFERRED EMBODIMENT

Figure 1:
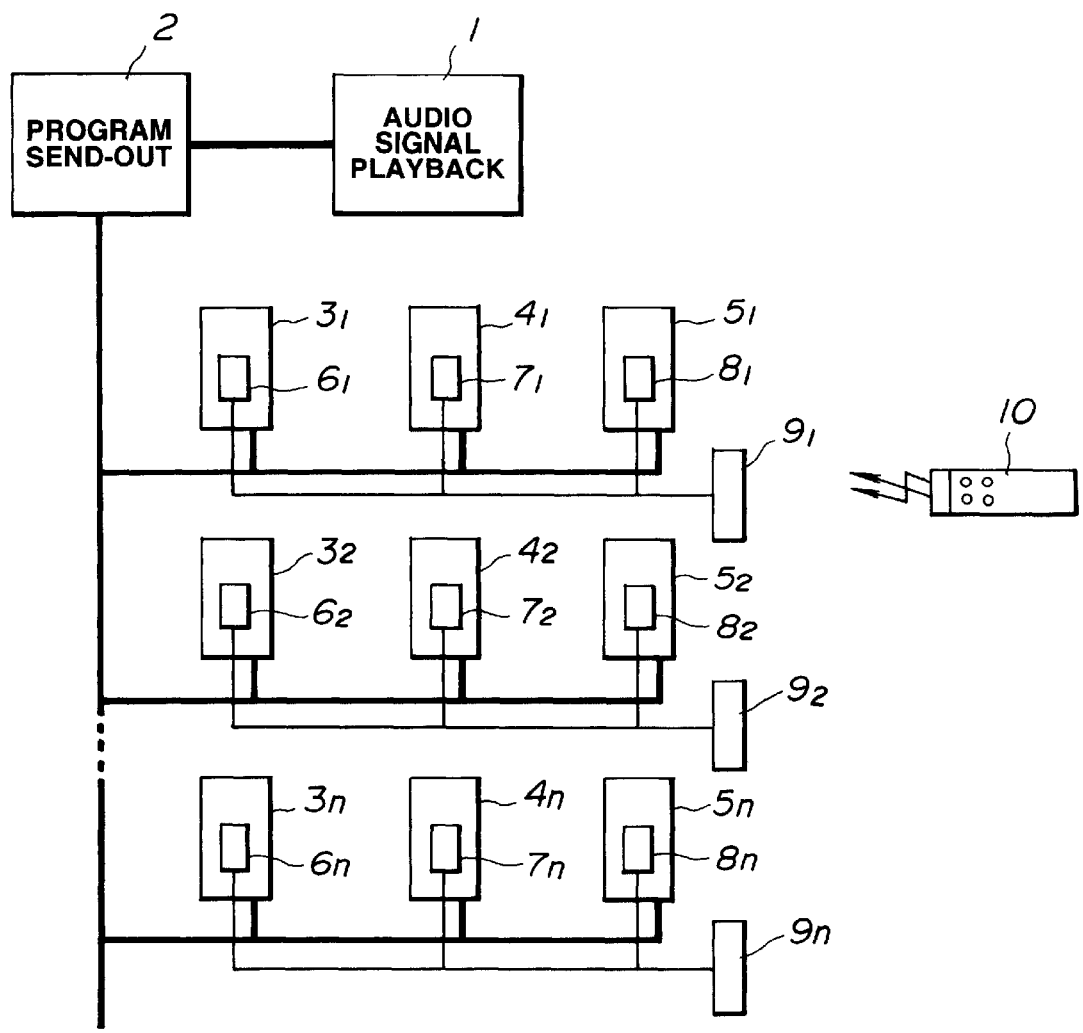
FIG. 1 is a block diagram showing an audio signal supplying device in an aircraft according to an embodiment of the present invention.

Referring to the drawings, a preferred embodiment of the present invention will be explained in detail.

The illustrated embodiment is directed to an audio signal supplying device in which the signal supplying and receiving system according to the present invention is applied to an audio signal sending/receiving system configured for sending/receiving audio signals in an aircraft. This audio signal supplying device has a fee channel and an ordinary non-fee channel. The fee channel furnishes a special program to the passenger subject to payment of a prescribed fee.

Referring to FIG. 1, the audio signal supplying device of the illustrated embodiment includes an audio signal reproducing unit 1, such as a compact disc (CD) player or a tape recorder, and a program sending unit 2 for sending out audio signals from the audio signal reproducing unit 1 as a program. The audio signal supplying device also includes operating units for passengers $3_1$, $4_1$, $5_1$, $3_2$, $4_2$, $5_2$, . . . $3_n$, $4_n$ and $5_n$ arranged on the arm rests of seats and having a selection switch for the passenger to select a desired channel, a sound volume switch and a headphone jack. The audio signal supplying device also includes control circuits $6_1$, $7_1$ and $8_1$ enclosed in the operating panels for passengers $3_1$, $4_1$ and $5_1$, respectively, and a remote-controlled light-receiving unit $9_1$ connected in common to the control circuits $6_1$, $7_1$ and $8_1$ so as to be used as a remote-control signal receiving unit. The audio signal supplying device also includes a remote-controlled light-receiving unit $9_2$ connected in common to the control circuits $6_2$, $7_2$ and $8_2$ enclosed within the operating units for passengers $3_2$, $4_2$ and $5_2$ and a remote-controlled light-receiving unit $9_n$ connected in common to the control circuits $6_n$, $7_n$ and $8_n$ enclosed within the operating units for passengers $3_n$, $4_n$ and $5_n$. It is a remote controlling unit 10 that sends out a remote-controlled signal of an infrared light beam to these remote-controlled light receiving units $9_1$, $9_2$, . . . $9_n$.

Figure 2:
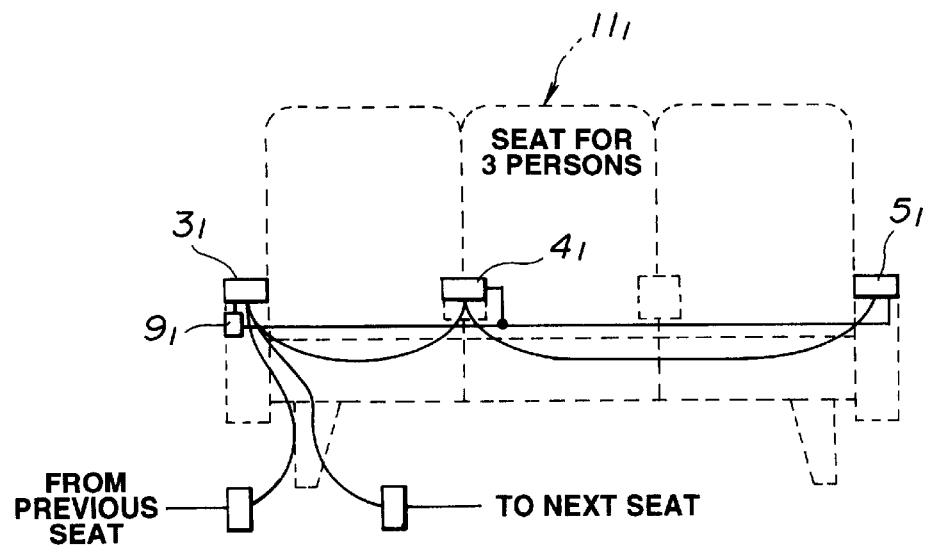
FIG. 2 illustrates the mounting state of an operating unit employed in the audio signal supplying device of the embodiment shown in FIG. 1.

The operating units for passengers $3_1$, $4_1$ and $5_1$ are arranged on arm rests of a seat $11_1$ for three as shown in FIG. 2. The remote controlled light receiving unit $9_1$ is arranged in the vicinity of the operating unit for the passenger $3_1$. Thus the remote-controlled light receiving units $9_1$, $9_2$, . . . $9_n$ are provided for groups of a pre-set number of seats, herein three seats.

Figure 3:
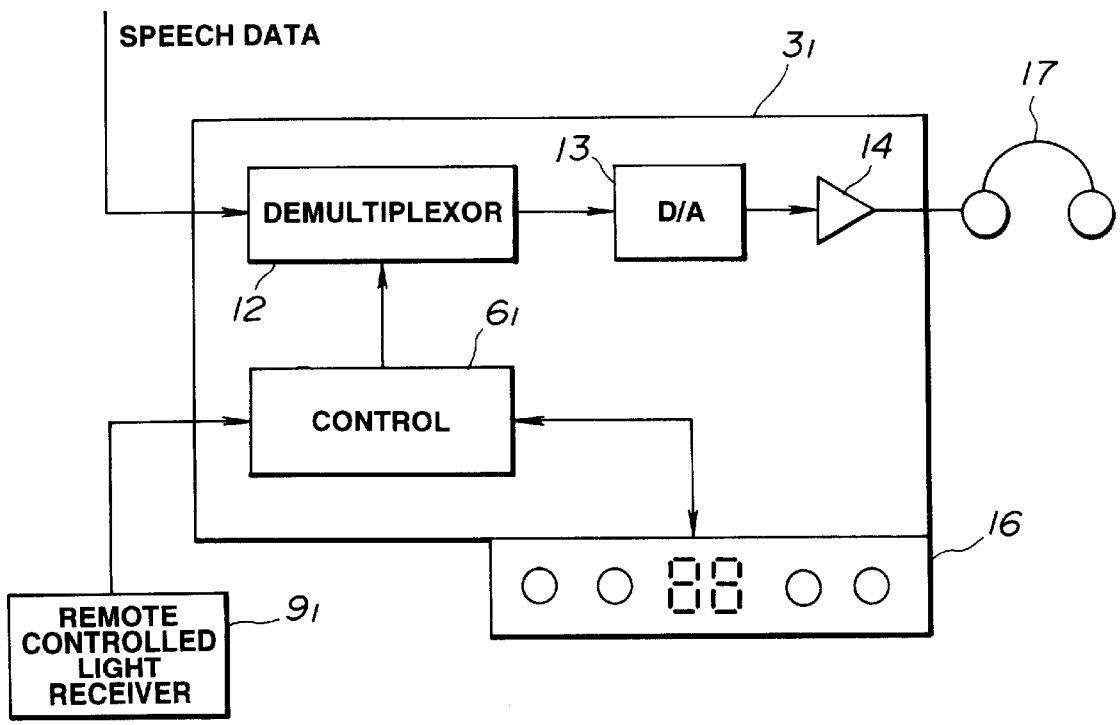
FIG. 3 is a block diagram of the operating unit for the passenger.

The operating unit for the passenger $3_1$, for example, includes a demultiplexor 12, as selecting means for selecting a desired channel, and the controller $6_1$ for inhibiting part of channel selection executed by the demultiplexor 12 and for canceling partial inhibition of channel selection of the demultiplexor 12 responsive to the remote-control operating signal received by the remote controlled light receiving unit $9_1$, as shown in FIG. 3. The operating unit for the passenger $3_1$ also includes a digital/analog (D/A) converter 13 for converting digital audio data from the demultiplexor 12 into analog audio data, an amplifier for amplifying the analog audio data via a headphone 17 to a level that can be heard by the passenger and a switch panel 16 for switch actuation by the passenger and for indicating a channel number.

The controller $6_1$ is fed, via remote controlled light receiving unit $9_1$, a remote-control signal sent from the remote control unit 10.

Figure 4:
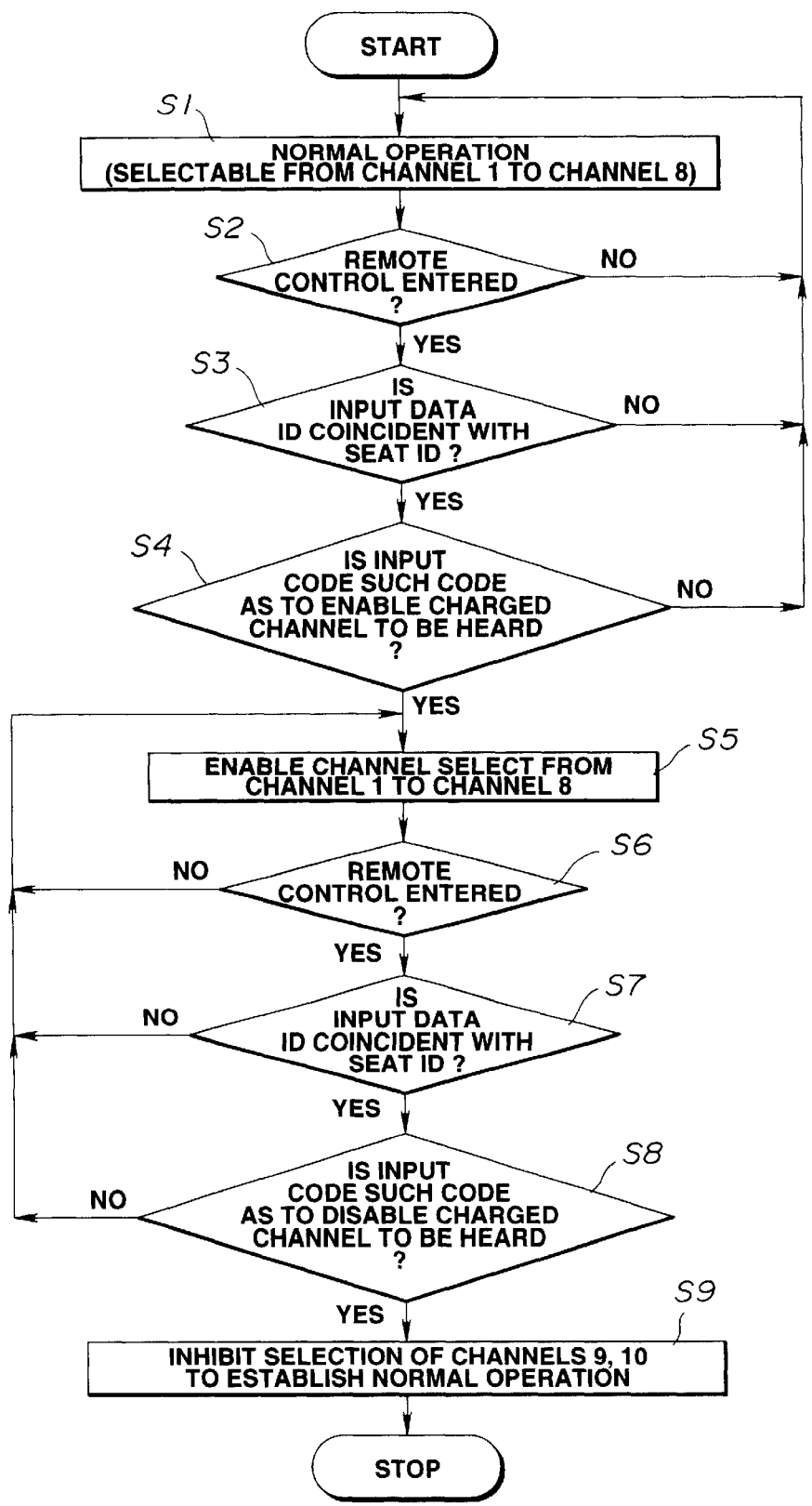
FIG. 4 is a flow chart for illustrating the operation of the audio signal supplying device.

The number of channels that can be offered for the audio signal sending/receiving system is, for example 10 (channels 1 to 10), of which the channels 1 to 8 are free of charge and the channels 9 and 10 are fee channels. The operation of the illustrated embodiment is explained with reference to the flow chart of FIG. 4.

Different programs of audio data reproduced by the audio signal reproducing unit 1 are sent to the program sending unit 2 which digitizes and multiplexes these programs of audio data. The digitized and multiplexed audio data are supplied to the operating units for passengers.

It is assumed that the passenger actuates a channel selection key of the switch panel 16 in order to select a desired channel. If the passenger actuates the channel selection key on the switch panel 16, the controller $6_1$ sends a command to the demultiplexor 12 to select the data of the desired channel.

For normal operation, the channels 1 to 8 are free of charge and can be selected, as indicated at step S1. If a passenger desires a fee program of the channel 9 or 10, he or she pays the fee to the crew in charge. The crew receiving the fee directs a light emitting section of the remote operating unit 10 to e.g., the remote controlled light receiving unit $9_1$ and enters information identifying the seat of the passenger desiring to hear the fee channel, while actuating a key in order to permit the fee channel to be heard.

The controller $6_1$ then first judges whether or not there has been entered any remote controlled input at step S2. If it is judged that the remote controlled input has been entered, the controller transfers to step S3 in order to judge whether or not an ID as the seat recognition information of the input remote-controlling signal coincides with an ID of the seat. If the result of the judgment at step S2 is NO, that is if it is judged that no remote-controlled input has been entered, the controller reverts to step S1.

If the result of the judgment at step S3 is YES, that is if the ID of the seat is coincident with that of the input data, the controller $6_1$ transfers to step S4 in order to judge whether or not the input data is a code enabling the fee channel to be heard. If the result of judgment at step S3 is NO, that is if the ID of the seat is not coincident with that of the input data, the controller $6_1$ reverts to step S1.

If the result at step S4 is YES, that is if the input data is a code permitting the fee channel to be heard, the controller $6_1$ transfers to step S5 in order to enlarge the channel selection to a range from channel 1 to channel 10. If the result of the judgment at step S4 is NO, that is if the input data is judged not to be the code authorizing use of the fee channel, the controller reverts to step S1.

Since the channel selection has been expanded at step S5, the passenger is able to hear the fee program of the channel 9 or 10 responsive to actuation of the channel selection key on the switch panel 16.

The controller $6_1$ then judges at step S6 whether or not any remote-controlling input has been entered. This is done by the crew judging after the end of the fee program or on the passenger's request whether or not there has been any remote control input with the aid of the remote control unit 10. If the result of the judgment is YES, that is if it has been judged that a remote control input has been entered, the controller transfers to step S7 in order to judge whether or not the ID of the input data is coincident with the ID of the seat. If it is judged at step S6 that no remote control input has been entered, the controller reverts to step S5.

If the result of the judgment at step S7 is YES, that is if the controller $6_1$ judges that the ID of the input data coincides with the ID of the seat, the controller transfers to step S8 in order to judge whether or not the input data is a code which disables the fee channel from being heard. Conversely, if the result of the judgment at step S7 is NO, that is if the controller $6_1$ judges that the ID of the input data is not coincident with the ID of the seat, the controller reverts to step S5.

If the result of the judgment at step S8 is YES, that is if the controller $6_1$ judges that the input data is a code which disables the fee channel from being heard, the controller transfers to step S9 in order to inhibit selection of the channel 9 or 10 as the fee channel to leave only the normal operation shown at step S1. Conversely, if the result of the judgment at step S8 is NO, that is if the controller $6_1$ judges that he input data is not a code which disables the fee channel from being heard, the controller reverts to step S5.

Since the channel selection at step S8 is reduced at step S8, the passenger is unable to receive the program of the fee channel 9 or 10.

With the illustrated embodiment, a sole remote control unit 10 suffices in order to control the totality of the seats. On the other hand, since the operation is carried out by only the crew, there is no risk of loss of the remote control device.

On the other hand, the remote controlled light receiving unit $9_1$ supplies a common remote control signal to the operating units for passengers $3_1$, $4_1$ and $5_1$ and to the control circuits $6_1$, $7_1$ and $8_1$ of the group of seats. Thus, it is not necessary to provide the remote controlled light receiving unit in each seat.

The remote control signal includes the information for identifying the seats of the groups of seats. For example, if the seat is the seat for three, the information my be the information "aisle", "window" and "center". Thus the operating units for passengers $3_1$, $4_1$ or $5_1$ cause the associated control circuit $6_1$, $7_1$ or $8_1$ to cancel partial inhibition of selection of the demultiplexor 12 to offer audio signals from the fee channel to the passenger if the information for identifying the seats of the group of seats contained in the remote control information coincides with the passenger attempting to access the fee channel.

If the operating unit for passenger $3_1$ is provided on the window side seat, and the passenger seated in this window side seat desires to hear the program of the channel 10, that is the fee channel, the signal supplying device of the illustrated embodiment operates as follows:

The passenger seated in the window side seat tells the crew that he or she desires to hear the program of the channel 10 which is the fee channel. The crew then brings the remote controlling unit 10 close to the remote controlled light receiving unit $9_1$ and presses the switch having the indication "WINDOW" thereon. The remote controlling signal generated by the remote controlling device 10 includes the information for canceling the selective inhibition of the demultiplexor 12 in addition to the information for identifying the window side operating unit for passenger $3_1$. This remote control signal is supplied via remote controlled light receiving unit $9_1$ to the controller $6_1$ of the operating unit for passenger $3_1$ designated as being the window seat. The controller $6_1$ is also supplied with the information on the selection of the channel 10 as selected by the passenger on the switch panel 16. The controller $6_1$ is responsive to the 10-channel select information from the switch panel 16 and the remote control signal from the remote controlled light receiving unit $9_1$ to cancel the selective inhibition of the channel 10 of the demultiplexor 12. Thus the passenger seated in the window-side seat fitted with the operating unit for passenger $3_1$ is able to receive the program of the channel 10 which is the fee channel.

With the above-described audio signal supplying device of the illustrated embodiment, since the control circuits $6_1$, $7_1$, $8_1$, $6_2$, $7_2$ and $8_2$, ... $6_n$, $7_n$, $8_n$ within the operating units for passengers $3_1$, $4_1$, $5_1$, $3_2$, $4_2$, $5_2$, ... $3_n$, $4_n$ and $5_n$, provided for respective seats, are responsive to a remote control actuating signal received by the remote controlled light receiving units $9_1$, $9_1$, ... $9_n$ to cancel the selective inhibition of the demultiplexor operating as a channel selection inhibiting means within the passenger actuating unit, it is not necessary to provide a dedicated adapter or headphone or complex device thus realizing low costs. On the other hand, since a sole remote control device is able to control the operation for respective seats while there is no necessity of providing the remote-controlled light receiving units for respective seats, and the operation of the remote control unit is executed by only the crew, the remote control device becomes easier to manage for further lowering the cost.

The present invention is not limited to the above-described embodiment of the signal supplying device. For example, the signal supplying device may be applied for supplying picture or other information signals, in addition to audio signals.

On the other hand, the signal supplying device of the present invention is applicable not only to the audio signal sending/receiving device within a aircraft, but to similar devices in other vehicles, such as trains. Of course, picture signals or, other signals may also be supplied within these other vehicles.

What is claimed is:

1. A signal supplying/receiving system comprising:

an operating unit for a passenger provided in association with each of a plurality of seats within a vehicle, and a supplying device for supplying data signals over a plurality of channels to said operating units, said plurality of seats being divided into groups, each group comprising at least two seats, wherein each said operating unit comprises selecting means for selecting one of said plurality of channels supplied from said supplying device, said selecting means associated with the seats in one of said groups of seats being controlled by controlling means, said controlling means selectively inhibiting selection of one or more of said channels by said selecting means, said controlling means being connected to a remote control signal receiving unit responsive to a remote control signal, wherein said remote control signal, received by said receiving unit, identifies one of said seats in the group of seats, and, in response to said remote control signal, said controlling means cease to inhibit selection of said one or more inhibited channels by the selecting means associated with the seat which is identified by said remote control signal.

2. The signal supplying/receiving system as claimed in claim 1, wherein there are three seats in the group of seats and said three seats are respectively identified by said remote control signal as window seat, center seat and aisle seat.

3. The signal supplying/receiving system as claimed in claim 1, wherein said controlling means resumes inhibiting selection of said one or more channels by said selection means in response to a second remote control signal for the selecting means associated with a seat identified in said second remote control signal.

4. The signal supplying/receiving system as claimed in claim 1, wherein there are two seats in the group of seats and said two seats are respectively identified by said remote control signal as window seat and aisle seat.

5. The signal supplying/receiving system as claimed in claim 1, wherein a remote controlling signal receiving unit is provided for each group of seats.

6. The signal supplying/receiving system as claimed in claim 1, further comprising a hand-held remote control unit for generating said remote control signal and transmitting said remote control signal to said remote control signal receiving unit.

7. The signal supplying/receiving system as claimed in claim 1, wherein the data signals supplied from said supplying device are audio signals.

8. The signal supplying/receiving system as claimed in claim 1, wherein said remote control signal is wirelessly transmitted to said remote control signal receiving unit.

9. The signal supplying/receiving system as claimed in claim 8, wherein said remote controlling signal is an infrared light beam emitted by a remote controller.

10. The signal supplying/receiving system as claimed in claim 1, wherein said selecting means may still select one of a plurality of channels when said controlling means inhibits said one or more channels.

* * * * *

UNITED STATES PATENT AND TRADEMARK OFFICE
CERTIFICATE OF CORRECTION

PATENT NO.     : 6,377,188 B1                                    Page 1 of 1
DATED          : April 23, 2002
INVENTOR(S)    : Maruyama It is certified that error appears in the above-identified patent and that said Letters Patent is hereby corrected as shown below:

<u>Title page,</u>
Item [*] Notice, delete "0" and insert -- 1160 --.

Signed and Sealed this

Fifteenth Day of July, 2003

JAMES E. ROGAN
*Director of the United States Patent and Trademark Office*